Aug. 3, 1965 R. O. SCOFIELD, SR., ETAL 3,198,897
DOMESTIC APPLIANCE TIMER WITH CARD ACTUATED SWITCHES
Filed Oct. 9, 1961 4 Sheets-Sheet 1
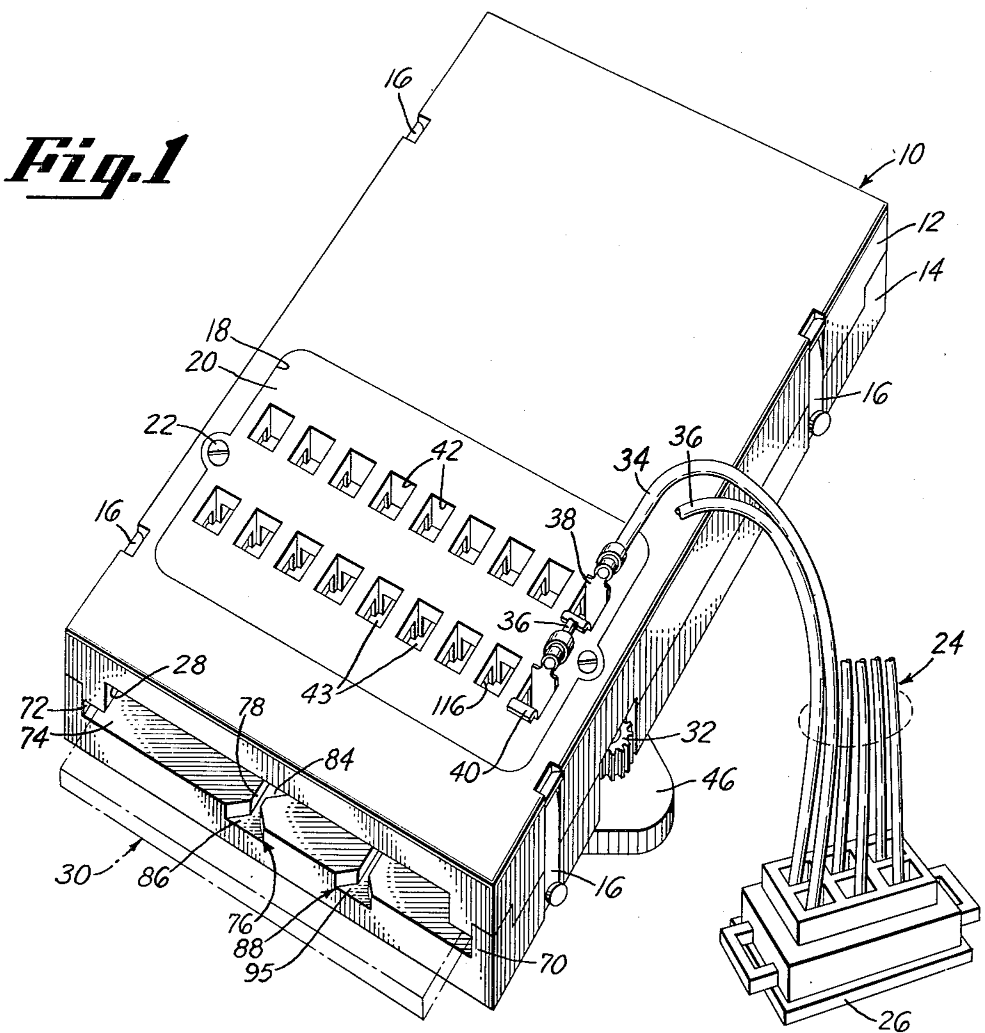
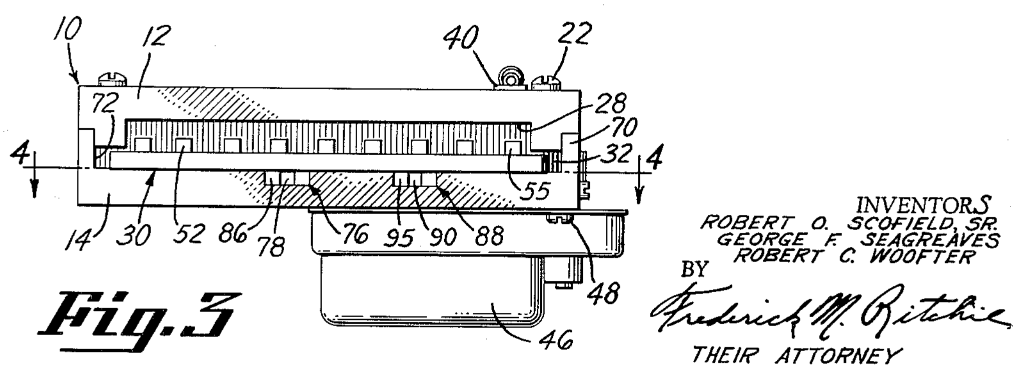
INVENTORS
ROBERT O. SCOFIELD, SR.
GEORGE F. SEAGREAVES
ROBERT C. WOOFTER
BY Frederick M. Ritchie
THEIR ATTORNEY DOMESTIC APPLIANCE TIMER WITH CARD ACTUATED SWITCHES
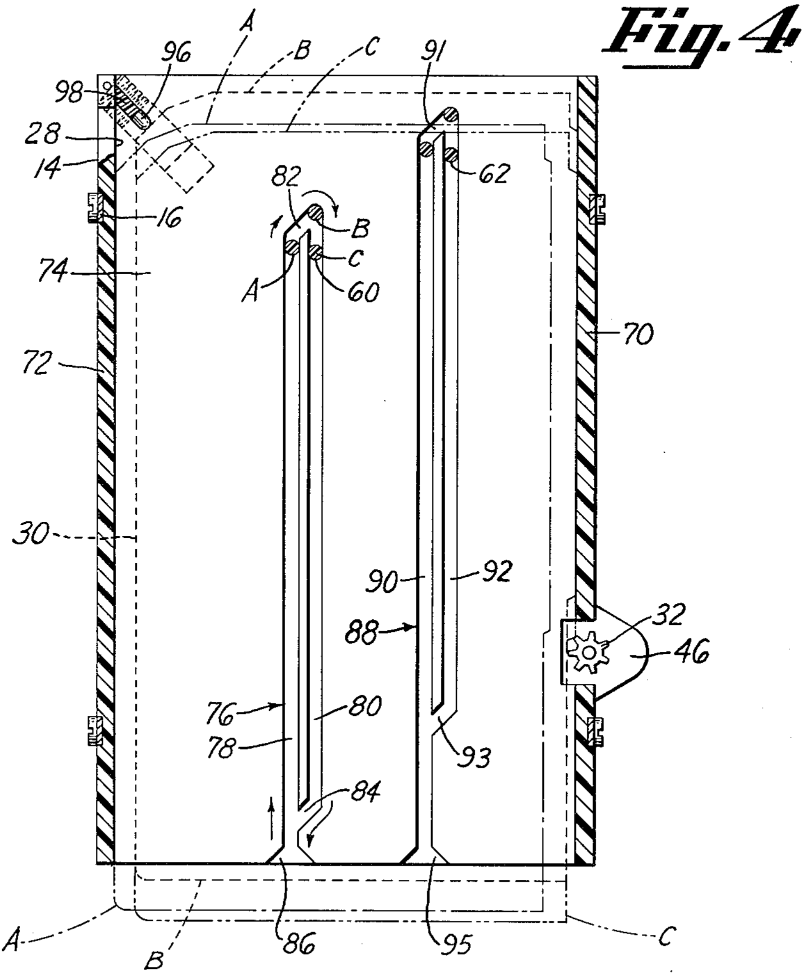
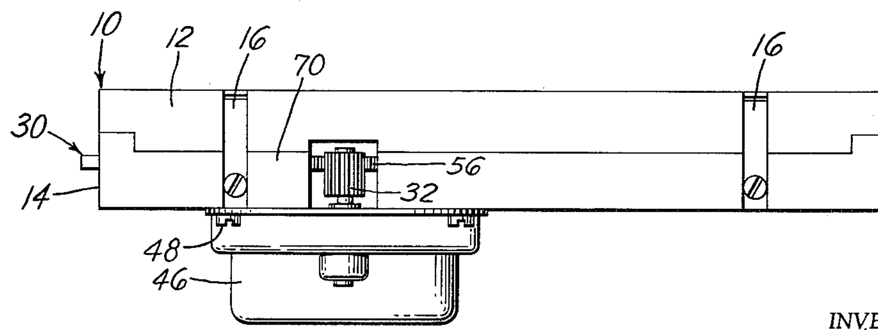
Fig. 2
INVENTORS
ROBERT O. SCOFIELD, SR.
GEORGE F. SEAGREAVES
ROBERT C. WOOFTER
BY
Frederick M. Ritchie
THEIR ATTORNEY

DOMESTIC APPLIANCE TIMER WITH CARD ACTUATED SWITCHES

INVENTORS
ROBERT O. SCOFIELD, SR.
GEORGE F. SEAGREAVES
ROBERT C. WOOFTER
BY
Frederick M. Ritchie
THEIR ATTORNEY DOMESTIC APPLIANCE TIMER WITH CARD ACTUATED SWITCHES
Filed Oct. 9, 1961 4 Sheets-Sheet 4
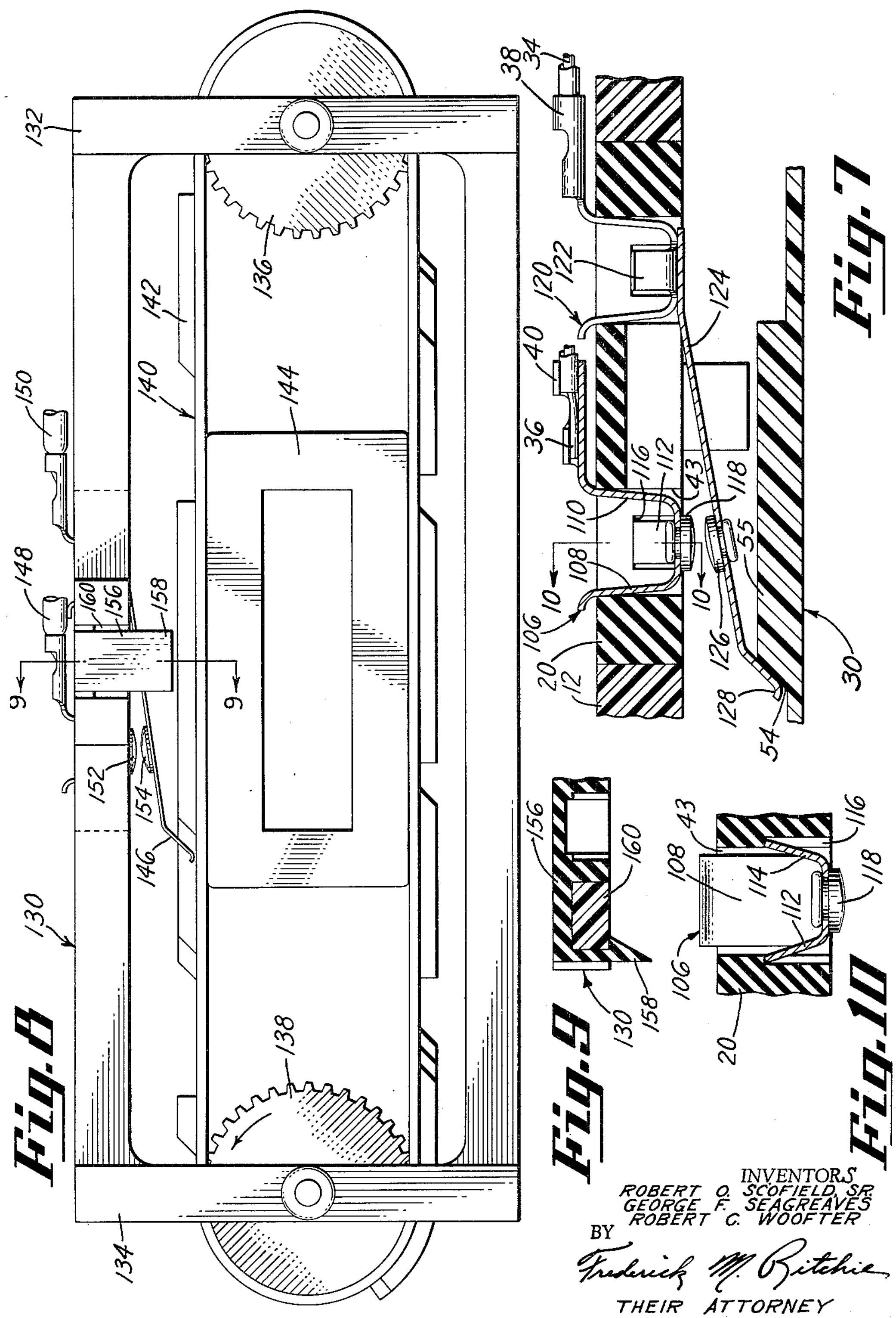

United States Patent Office 3,198,897

Patented Aug. 3, 1965

3,198,897

DOMESTIC APPLIANCE TIMER WITH CARD ACTUATED SWITCHES

Robert O. Scofield, Sr., and George F. Seagreaves, Warren, and Robert C. Woofter, Cortland, Ohio, assignors to General Motors Corporation, Detroit, Mich., a corporation of Delaware Filed Oct. 9, 1961, Ser. No. 143,916

10 Claims. (Cl. 200—46)

This invention relates to a domestic appliance and more particularly to an improved appliance timer suitable for use with automatic clothes washers and dryers.

As automatic appliance cycles have become more and more complicated, the timer for controlling the appliance has necessarily become larger and more complicated also to control the additional circuitry. Using prior art techniques wherein circuit switches are operated by a plurality of rotating cams, the times become so cumbersome that servicing thereof is extremely difficult.

Accordingly, it is an object of this invention to provide an improved appliance timer which incorporates a selectable program card insertable into a timing device for effecting the cycle of operations programed on the selected program card.

It is also an object of this invention to provide an appliance timer with cam actuated switches which may be removable from the timer casing.

A further object of this invention is the provision of a timer in combination with a wiring harness for a particular appliance, said harness including the cam actuated switches and being adapted to plug into the timer casing for properly positioning the switches for sequential operation.

A still further object of this invention is the provision of an appliance timer which has a separate sub-assembly including all of the timer contacts, said sub-assembly being removable for inspecting the contacts.

Another object of this invention is the provision of a timer which can be adapted to control any desired cycle of operations.

A more specific object of this invention is the provision of a timer which incorporates a program card for a particular timed cycle, the insertion of said program card serving to initiate the timed cycle.

Further objects and advantages of the present invention will be apparent from the following description, reference being had to the accompanying drawings wherein preferred embodiments of the present invention are clearly shown.

In the drawings:

FIGURE 1 is a perspective view of the timer of this invention;

FIGURE 2 is a side elevational view of the timer shown in FIGURE 1;

FIGURE 3 is an end elevational view of the timer;

FIGURE 4 is a sectional view taken along line 4—4 in FIGURE 3;

FIGURE 7 is an enlarged fragmentary sectional view of a cam actuated switch suitable for use with this invention;

FIGURE 8 is a side elevational view of another form of this invention;

FIGURE 9 is a fragmentary sectional view taken along line 9—9 of FIGURE 8; and

FIGURE 10 is a fragmentary sectional view taken along line 10—10 of FIGURE 7.

Figure 5:
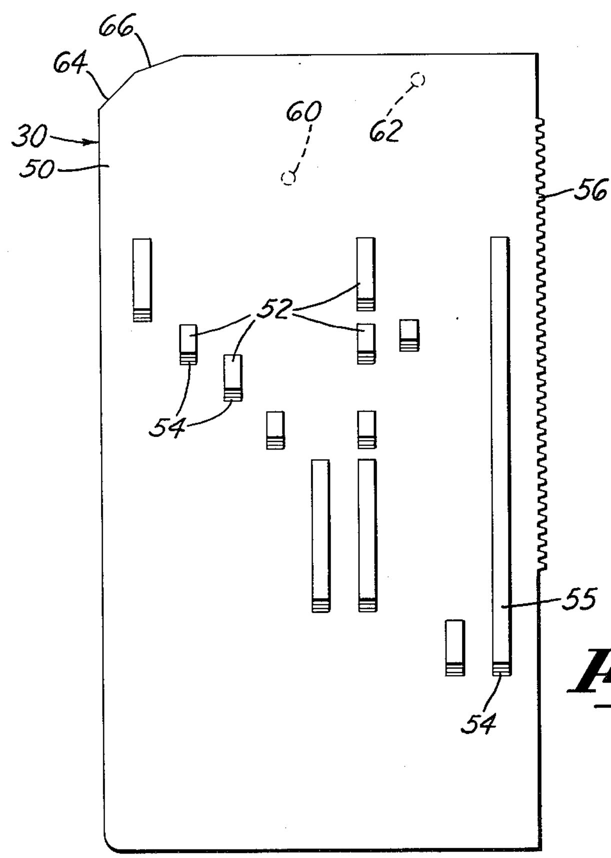
FIGURE 5 is a top elevational view of a program card suitable for use with this invention.

In accordance with this invention and with reference to FIGURE 1 a timer 10 is shown generally which is adapted for use with any domestic appliance. The timer 10 may be installed in a control panel of the appliance or in any other location suitable for servicing. The timer 10 is comprised generally of an upper housing 12, a lower housing 14 joined to the upper housing 12 as by a series of spring clips 16 about the periphery of the timer casing. The upper housing 12 is formed with an opening 18 for receiving a terminal block 20 in plug-in fashion—the terminal block 20 being retained thereto by fastening screws 22 along opposite side thereof.

The timer 10 is designed to include a plug-in wiring harness assembly shown generally at 24. The wiring harness 24 incorporates the timer terminal block 20 which plugs into the timer 10 as well as an appliance terminal block 26 at the opposite end of the wiring which plugs into the appliance. In this way the timer 10 can be quickly and easily assembled to the appliance. It is necessary merely to plug the terminal block 26 into the wiring circuitry for the appliance and to plug the terminal block 20 into the timer 10. Variously designed terminal blocks 20 could be adapted, of course, to interfit with the timer 10 and need include only a plurality of openings 42, 43 to receive cooperating switch elements 38, 40 respectively.

When the upper and lower housings 12 and 14 of the timer are connected together they form a slot or cavity 28 into which a program card 30 may be manually inserted. In general, the program card 30 is pushed manually into the cavity 28 from one end and is shifted automatically at the opposite end of the cavity into engagement with a drive pinion 32 which serves then to move the card 30 back out of the cavity. As the card moves out of the cavity, raised cam ramp portions on the card serve to actuate circuit switches to selectively energize and deenergize conductors such as 34 and 36 which are connected to the terminal connectors 38 and 40 respectively. It should be understood that the number of terminal connectors 38, 40 and pairs of openings 42, 43 will depend on the number of appliance circuits to be controlled.

The pinion 32 is driven by a timing means such as a synchronous motor 46 attached as by screws 48 to the underside of the lower housing 14 of the timer. The motor 46 is generally energized manually by one seeking to initiate the appliance cycle. However, it is within the purview of this invention to cause the motor 46 to be energized automatically by placing a motor switch in the path of the program card 30 so that the motor will be energized whenever the card is inserted into the cavity 28 of the timer.

Figure 6:
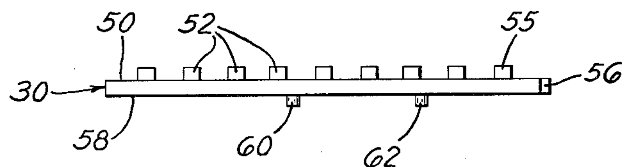
FIGURE 6 is an end elevational view of the program card.

Turning now to FIGURES 5 and 6 the program card 30 is shown to comprise a top side 50 with a plurality of raised cam ramp surfaces or embossments 52, each having sloping cam lead portions 54, for selectively manipulating a switch follower arm as will be described more fully hereinafter. One edge of the card 30 has a plurality of teeth molded to form a rack 56 on one edge thereof for driving the card out of the timer and the bottom 58 of the card has two molded nibs or guide lugs 60 and 62 for guiding the card into the timer. One corner of the card 30 is formed with a couple of angular cam edges 64, 66 which cooperate with a biasing means to shift or shuttle the card 30 into driven relationship with the pinion 32 when the card is inserted into the timer. This operation will be described more fully next following.

The system whereby the program card is manually inserted and then automatically shifted into timed drive relationship with the pinion 32 will best be described with reference to FIGURE 4. Note that the lower housing 14 is formed with sidewalls 70, 72 which form a trough or channel-like cavity 28 having a bottom wall 74. In the bottom of the channel a pair of closed circuit guide tracks are formed. More particularly, a left-hand guide track 76 is comprised of a first recessed guide path or insert track 78 and a second return track 80 in parallel spaced relationship to said insert track 78. Joining each end of the tracks 78 and 80 are interconnecting shift track portions 82 and 84 for shuttling the card lug 60 between said tracks. These track portions 78, 80, 82 and 84 form the closed circuit guide track 76 to which access is gained by way of a flared entrance portion 86 at the inlet end of the cavity 28 to receive the card guide lug 60. A second closed circuit track 88 having parallel tracks 90, 92 and interconnecting tracks 91, 93 is molded in the lower housing 14 to receive and guide the card lug 62. At one corner of the channel 28 a piston 96 is reciprocatably positioned and biased by a spring 98 into the cavity toward the shift track portion 82 of the closed circuit track 76. The purpose of the spring biased piston 96 is to shift or shuttle the card 30 from one side of the channel 28 to the other side thereof so that the rack 56 on the edge of the card may be engaged with the drive pinion 32.

The manner in which the program card 30 is inserted and automatically engaged with the timer is best seen in FIGURE 4 wherein the piston 96 and guide lugs 60, 62 are given positions A, B and C as the card is respectively inserted, shuttled and driven. In general the card 30 is manually inserted into the channel or cavity 28 along the left wall 72 of the channel and assumes the position shown by the representation A. As the program card 30 is driven out of the cavity 28 by the pinion 32 it assumes the position C. More particularly, the control cycle is initiated by selecting the desired control cycle program card 30 and inserting the tapered corner end into the cavity in a manner that positions the guide lugs 60 and 62 in the flared entrance portions 86 and 95 respectively. The guide lugs 60 and 62 will, during card insertion, traverse a path governed by the guide tracks 78 and 90, i.e. position A. As the card reaches the other end of the channel 28, the spring biased piston 96 will sequently engage the tapered corners 66 and 64 of the program card, thereby kicking the program card to the right with the lugs 60 and 62 traversing the shift track portion 82 and 91 respectively (position B) to place the rack 56 in engagement with the other side 70 of the channel. Next the piston biases the card toward the insert end of the channel until the rack engages the pinion 32 (position C). Then the operator may energize the motor 46 to rotate the pinion 32 and drive the card the rest of the way out of the channel. When the card 30 is fully inserted and shifted to the right, the various control embossments 52 on the card are positioned in line with their respective timer switches.

The manner in which the terminal connectors 38 and 40 fasten to the terminal block 20 is best seen in FIGURE 7 and FIGURE 10. Note that the terminal connector 40 is formed with a cup-like guide portion 106 having front and back walls 108 and 110 and locking side walls 112 and 114. The terminal block 20 is molded with an undercut at 116 to snap fastenably receive the side walls 112 and 114 and lock the terminal connector 40 to the opening 43. The bottom of the cup-like guide piece 106 carries a fixed contact 118. Thus the terminal connector 40 is connected to one conductor 36 in the wiring harness 24 and is adapted to open and close a circuit through the other conductor 34 which is connected immediately adjacent the terminal connector 40 in the terminal connector 38.

With reference now to the terminal connector 38 a cup-like guide portion 120 is formed having side wall portions 122 identical to those connector pieces 112 and 114 on the terminal connector 40. Instead of the fixed contact the terminal connector 38 carries a movable switch arm 124 which carries a movable contact 126 in juxtaposition to the fixed contact 118. The switch arm 124 has a bent down follower portion 128 in alignment with its particular raised cam on the program card 30—in this instance the cam 55 when the card has been shifted to the position B. Note that the cam terminal portion 54 is formed on the bias so that the movable contact 126 may be raised smoothly into contact with the fixed contact 118 as the follower portion 128 of the switch arm engages the cam. Although the foregoing description has pertained only to one of the timer switches 118, 126, it should be understood that all of the selectively actuated switches which are to be positioned within the other terminal block openings operate the same as the switch shown in FIGURE 7.

In summary, one merely selects a program card 30 suitable for the particular appliance operation that is desired. The card is then inserted into the cavity 28 along the side wall 72 of the cavity. At the point that the card 30 engages the shift piston 96 the card is shifted from the left wall 72 of the timer to the right wall 70 and the card rack 56 is engaged with the pinion. At this time the card is driven out of the cavity by the energization of the timer motor 46. As the card moves out the various embossments 52 thereon actuate the various switches such as 118, 126 to operate the appliance in the desired fashion.

Another embodiment of this invention is shown in FIGURES 8 and 9 to include a molded endless belt type of timer rather than the insertable card described hereinbefore. More particularly, the embodiment shown in FIGURE 8 includes a frame 130 which has end struts 132 and 134 for journalling a pair of sprockets 136 and 138. Circumscribing the sprockets 136 and 138 is a program belt 140 which carries various molded cam lobes or embossments 142 on its radially outer surface. A guide 144 is positioned between the sprockets 136 and 138 to support the belt 140 as the embossments 142 pass beneath a switch follower 146. Here again terminal connectors such as 148 and 150 serve to complete a control circuit through a fixed contact 152 and a movable contact 154.

In the embodiment of FIGURES 8 and 9 the terminal block 156 is provided with a downwardly extending snap tang 158 which interlockingly connects with a side rail 160 of the frame 130. In this manner the terminal block 156 may be snap fastened to the frame 130.

In operation a belt 140 is selected to produce the desired operating cycle and slipped over the sprockets 136 and 138. A conventional sychronous motor (not shown) is then energized to drive the belt and its embossments beneath the various followers 146 of the cam actuated switches. In accordance with the design of the particular embossments 142 the switch elements 152 and 154 will be selectively engaged and the control circuit attached thereto selectively energized and deenergized.

It should now be seen that an improved timer has been designed whereby the various advances in automatic appliances can be programmed on any of the various number of insertable program cards. The particular mechanism illustrates a novel manner of shifting the program card from a manually insertable position to a synchronously driven position. Further, the invention embodies additional manufacturing and servicing advantages in that a separate wiring harness is utilized in combination with a timer housing so that the wiring harness at its opposite ends can be plugged into both the appliance and the timer respectively.

While the embodiments of the present invention as herein disclosed, constitute preferred forms, it is to be understood that other forms might be adopted.

What is claimed is as follows:

1. A timer comprising, an upper housing having a terminal block opening, a lower housing connected to said upper housing and forming an open ended rectangular channel between said terminal block opening and said lower housing, said channel having first and second spaced parallel guide tracks in the bottom thereof, shift track portions interconnecting said guide tracks at each end thereof to form a closed circuit and a flared entrance to said guide tracks at one end of said closed circuit, a spring biased piston at the opposite end of said channel from said flared entrance and extending into said channel from one side thereof toward the other end of said closed circuit, means forming a drive slot in a side of said channel opposite said piston, a pinion extending through said slot into said channel, a generally flat rectangular program card narrower than said channel adapted to be inserted in said channel through the open end thereof and having an upper program side and lower guide side and rack along one edge thereof, said guide side having a guide lug engageable with said first guide track through said track entrance to guide said card during movement thereof from said open end of said channel toward said piston, said piston engaging said card to force said lug along one of said shift track portions from said first guide track to said second guide track and said rack into engagement with said pinion when said program card is pushed from one end of said channel toward said piston, a terminal block removably positioned in said terminal block opening and supporting a timer switch, said switch having a fixed contact and a movable contact, said movable contact carried on a follower switch arm extending from said terminal block into said channel adjacent said upper program side, said upper program side having embossments in alignment with said switch arm when said guide lug is in said second guide track, and means for driving said pinion to move said program card out of said channel, thereby to selectively actuate said timer switch.

2. A timer comprising, a first housing having a terminal block opening, a second housing connected to said first housing and forming an open ended channel adjacent said terminal block opening, said channel having first and second spaced guide tracks in a wall thereof, shift track portions interconnecting said guide tracks to form a closed circuit and a tapered entrance to said guide tracks at one end of said closed circuit, a spring biased piston at the opposite end of said channel from said tapered entrance and extending into said channel from one side thereof toward the other end of said closed circuit, means forming a drive slot in a side of said channel opposite said piston, a pinion extending through said slot into said channel, a program card adapted to be inserted in said channel through the open end thereof and having a program side, a guide side and a rack, said guide side having a guide lug engageable with said first guide track through said track entrance to guide said card during movement thereof from said open end of said channel toward said piston, said piston engaging said card to force said lug along one of said shift track portions from said first guide track to said second guide track and said rack into engagement with said pinion when said program card is pushed from one of said channel toward said piston, a terminal block in said terminal block opening and supporting a timer switch, said switch having a fixed contact and a movable contact, said movable contact carried on a follower switch arm extending from said terminal block into said channel adjacent said program side, said program side having embossments in alignment with said switch arm when said guide lug is in said second guide track, and means for driving said pinion to move said program card out of said channel, thereby to selectively actuate said timer switch.

3. In combination with, a wiring harness having a first terminal block adapted to be plugged into an appliance and a second terminal block, a timer comprising, an upper housing having a terminal block opening for receiving said second terminal block in plug-in relationship to said timer, a lower housing connected to said upper housing and forming an open ended rectangular channel adjacent said terminal block opening, said channel having first and second spaced parallel guide tracks in the bottom thereof, shift track portions interconnecting said guide tracks to form a closed circuit and a tapered entrance to said guide tracks at one end of said closed circuit, a spring baiased piston at the opposite end of said channel from said tapered entrance and extending into said channel from one side thereof toward the other end of said closed circuit, means forming a drive slot in a side of said channel opposite said piston, a pinion extending through said slot into said channel, a generally flat rectangular program card narrower than said channel adapted to be inserted in said channel through the open end thereof and having an upper program side and lower guide side and a rack along one edge thereof, said guide side having a guide lug engageable with said first guide track through said track entrance to guide said card during movement thereof from said open end of said channel toward said piston, said piston engaging said card to force said lug along one of said shaft track portions from said first guide track to said second guide track and said rack into engagement with said pinion when said program card is pushed from one end of said channel toward said piston, said second terminal block removably positioned in said terminal block opening and supporting a timer switch, said switch having a fixed contact and a movable contact, said movable contact carried on a follower switch arm extending from said terminal block into said channel adjacent said upper program side, said upper program side having embossments in alignment with said switch arm, and means for driving said pinion to move said program card out of said channel, thereby to selectively actuate said timer switch.

4. In combination, a timer casing adapted for use with an automatic appliance, a program device in said casing for controlling the operation of said appliance, said casing having an opening and means for driving said program device in juxtaposition to said opening, and a wiring harness having a plurality of conductors joined at one end into a first terminal connector block adapted to interconnect with said automatic appliance and joined at the other end thereof into a second terminal connector block configuraton complementarily with said opening, said second terminal connector block removably insertable within said opening, said second terminal connector block carrying a program switch having a fixed contact portion connected to one of said conductors and snap fastenable to said second terminal connector block and having a movable contact portion connected to another of said conductors and snap fastenable to said second terminal connector block, said movable contact being moved by said program device as said driving means moves said program device past said opening.

5. A combination of claim 4 wherein said program device is a card having a protuberance thereon facing said opening and in alignment with said movable contact portion when said card is moving past said opening.

6. In combination, a timer casing adapted for use with an automatic appliance, said casing having an opening and means for driving a program device in juxtaposition to said opening, and a wiring harness having a plurality of conductors joined at one end into a first terminal connector block adapted to interconnect with said automatic appliance and joined at the other end thereof into a second terminal connector block configured complementarily with said opening and positioned in said opening, said second terminal connector block carrying a switch having a first contact connected to one of said conductors and a second contact connected to another of said conductors and movable relative to said first contact, said second contact being moved by said program device as said driving means moves said program device past said opening.

7. A timer comprising, casing means forming a channel and having a pair of parallel guide slots extending longitudinally of said channel, a switch means on said casing means having a fixed contact and a movable contact, said movable contact carried on a follower arm extending into said channel, a program card manually insertable in said channel and having a guide lug slideably positioned in one of said guide slots for directing said card throughout its insertion into said channel, means for shifting said guide lug from said one of said guide slots to the other of said guide slots to position said program card in selectively actuating relationship to said follower arm, and a power driven timing means engaging said card after said lug is shifted for automatically moving said card out of said channel, thereby to open and close said contacts.

8. The timer of claim 7 wherein said shifting means is a spring biased piston extending into said channel beside said guide slots in a manner to engage said porgram card at the innermost point of card insertion.

9. A timer comprising, means forming a channel having first and second guide means, a switch means having a fixed contact and a movable contact, said movable contact actuated by a follower arm extending into said channel, a program card insertable in said channel and having means for directing said card in said first guide means throughout its insertion into said channel, means for shifting said directing means from said first means to said second guide means to position said program card in selectively actuating relationship to said follower arm, and a power driven timing means engaging said card after said directing means is shifting for moving said card out of said channel, thereby to open and close said contacts.

10. A timer comprising, means forming a housing having first and second guide means, switch means having a fixed contact and a movable contact, said movable contact actuated by a follower arm extending into said housing, a program card insertable in said housing, means including said first guide means for guiding the movement of said card throughout its insertion into said housing and including said second guide means for guiding the movement of said card out of said housing, means for shifting said card from movement guided relationship with said first guide means to movement guided relationship with said second guide means to position said card in selectively actuating relationship to said follower arm, and a power driven timing means drivably connected to said card after said card is shifted for moving said card out of said housing, thereby to open and close said contacts.

References Cited in the file of this patent

UNITED STATES PATENTS 2,680,791 Chatelain ______________ June 8, 1954